Sept. 12, 1933.  H. W. LORMOR  1,926,156
LAMINATED STRUCTURE
Filed March 31, 1932
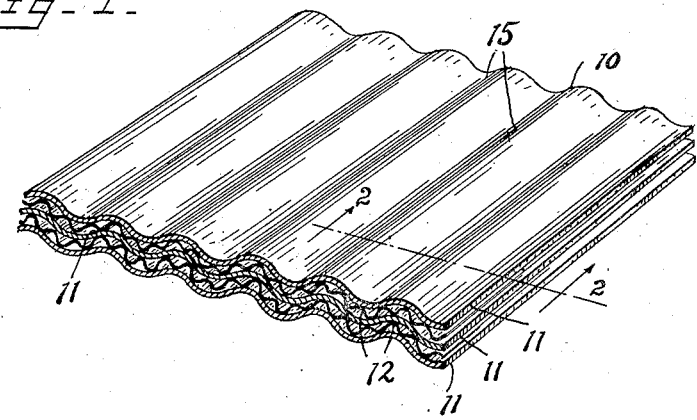
Fig-1-
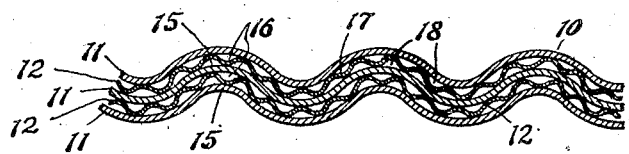
Fig-2-
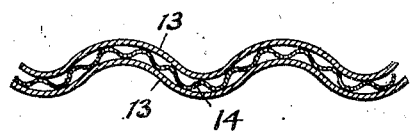
Fig-3-
INVENTOR
HENRY W. LORMOR
Kwis Hudson & Kent
Attys Patented Sept. 12, 1933

1,926,156

UNITED STATES PATENT OFFICE 1,926,156

LAMINATED STRUCTURE

Henry W. Lormor, Cleveland Heights, Ohio, assignor to Willard Storage Battery Company, Cleveland, Ohio, a corporation of West Virginia Application March 31, 1932. Serial No. 602,285

7 Claims. (Cl. 154—55)

This invention relates to laminated structures, and more particularly to a novel form of laminated sheet, which is especially useful for packing purposes, and which is well suited for the construction of containers and for various other uses.

An object of this invention is to provide a novel form of laminated sheet which is of wavy or undulatory form and which is resilient in character yet very tough and strong.

Another object of this invention is to provide a novel form of sheet material of the type mentioned, wherein a plurality of coextensive wavy sheets are connected by a resilient filler disposed therebetween.

A further object of this invention is to provide a novel form of laminated structure of the type mentioned, wherein a plurality of coextensive wavy fibrous sheets are arranged in spaced relation with ridges of one sheet opposite the grooves of another sheet, and wherein the spaced sheets are connected by a corrugated fibrous sheet disposed therebetween.

The invention may be further briefly summarized as consisting in certain novel combinations and arrangements of parts hereinafter described and particularly set out in the appended claims.

In the accompanying sheet of drawing,

Fig. 1 is a perspective view of a laminated structure embodying my invention;

Fig. 2 is a cross-section thereof taken on line 2—2 of Fig. 1; and

Fig. 3 is a cross-sectional view taken through another laminated structure embodying my invention.

Detailed reference will now be made to the accompanying drawing wherein I have illustrated a novel form of laminated structure, which is sufficiently resilient to render the same very useful as a packing material, yet which is very tough and strong and well adapted for the construction of containers and for other uses. Before proceeding with this detailed description, I wish to point out, however, that the invention is not necessarily limited in scope to the particular laminated structures illustrated and described, but may be embodied in various other forms or devices.

Generally speaking, the laminated structure of my invention is a composite material, which is preferably in sheet form, and which comprises a plurality of coextensive wavy or corrugated sheets, and a resilient connecting filler disposed between the adjacent surfaces of such sheets. These wavy sheets may be provided in any desired number, depending upon the strength and character of the laminated structure required. In Figs. 1 and 2 of the drawing I have shown the composite material of my invention in the form of the laminated sheet 10. In this instance the laminated sheet embodies three such wavy sheets 11, with a connecting filler 12 disposed between each pair of adjacent sheets, and may be referred to as a three-ply structure. In other instances it may be desirable to employ one or more wavy sheets in excess of the three shown in Figs. 1 and 2, or if desired only two wavy sheets may be used as shown in Fig. 3. In the latter figure the wavy sheets are designated by the reference character 13 and are connected by the corrugated filler 14.

The wavy sheets used in making up my laminated structure may be of any suitable material, such as a paper composed of jute fibers and, as shown in the drawing, are arranged with the ridges 15 of one sheet disposed opposite or extending into the grooves 16 of the next adjacent wavy sheet. The ridges of the several wavy sheets are uniformly spaced apart, so that when the several sheets are in the desired assembled relation, as shown in the drawing, the laminated structure as a whole will be of a corrugated or wavy form, with its ridges spaced apart the same distance as the ridges of the individual wavy sheets.

According to my invention the wavy sheets are retained in the desired assembled relation by employing the resilient filler 12, which is disposed between the adjacent surfaces of the wavy sheets 11, and which imparts to the laminated structure a resilient or yielding characteristic. Any appropriate substance may be employed as this connecting filler, but I prefer to employ a corrugated sheet for this purpose. This corrugated connecting sheet may be formed of any suitable material, but I find that a sheet of jute paper serves very well for this purpose.

As shown in Fig. 2 of the drawing, the waves or ridges 17 of the corrugated connecting sheet are much more numerous than the ridges of the wavy sheets 11, and when the connecting sheet is disposed between the latter sheets the tops of the ridges of the connecting sheet engage the adjacent surfaces of the wavy sheets at substantially uniformly spaced points. The tops of the ridges of the connecting sheet may be secured to the adjacent surfaces of the wavy sheets by any appropriate means, such as by the use of a suitable glue or other adhesive. In assembling the connecting sheet between the wavy sheets, it will be noted that the ridges of the connecting sheet extend substantially parallel with the ridges of the wavy sheets, so that the grooves of the connecting sheet form a plurality of air cells or chambers 18, resulting in a laminated structure which is light in weight and of a resilient character. This laminated structure is also very tough and strong because of the numerous connections between the wavy sheets and the tops of the ridges of the filler, and also because of the numerous braces or struts 19 provided between adjacent wavy sheets by the transversely extending portions of the filler.

Although the laminated structure which I have disclosed may be constructed according to any suitable method or by the use of any suitable apparatus, I believe that best results are obtained when the sheets 11 are given their wavy or undulatory form prior to assembly. In assembling my laminated structure, the wavy sheets are arranged as shown in the drawing, with a corrugated connecting filler 12 disposed therebetween, and with the ridges of one sheet disposed opposite the grooves of an adjacent sheet, as explained above. The several parts are retained in this position by applying glue, or other suitable adhesive, to the tops of the ridges of the connecting sheets, the glue or adhesive being allowed to set or dry while the sheets are held together by the application of pressure thereto. When the structure is formed in this manner I find that the air cells, provided by the grooves of the connecting sheets, are not broken or collapsed, as might be the case if the several sheets were first assembled and thereafter given their wavy or undulatory form by the application of pressure.

It will now be readily seen that I have provided a novel form of laminated structure, which is more resilient, and in some respects, is stronger than the flat laminated structures of this general type heretofore provided. Because of its resilient character the laminated structure which I have provided is especially suitable for use as a packing or packaging material, and because of its toughness and strength is also very well adapted for the construction of containers and for various other uses.

While I have illustrated and described the structure of my invention in a detailed manner, it should be understood, however, that I do not intend to limit myself to the precise details of construction and arrangements of parts illustrated and described, but regard my invention as including such changes and modifications as do not involve a departure from the spirit of the invention and the scope of the appended claims.

Having thus described my invention, what I claim is:

1. A laminated structure of the character described comprising a plurality of substantially uniformly spaced corrugated sheets, and a corrugated member disposed between said sheets and connected to the adjacent surfaces of the latter, the corrugations of said member being more numerous than the corrugations of said sheets and said member being of wavy form to follow the contour of and to contact at numerous points with the corrugated surfaces of said sheets.

2. A laminated structure of the character described comprising a plurality of spaced corrugated sheets arranged with the ridges of one sheet disposed opposite the grooves of an adjacent sheet, and a resilient filler extending between said sheets and connected to the adjacent surfaces of the latter, said filler being of wavy form to follow the contour of and to contact with both ridged and grooved portions of adjacent surfaces of said sheets.

3. A laminated structure of the character described comprising a plurality of spaced corrugated sheets, and a connecting sheet coextensive with said corrugated sheets and disposed therebetween, said connecting sheet being attached at spaced points to both ridged and grooved portions of the adjacent surfaces of said corrugated sheets.

4. A laminated structure of the character described comprising a plurality of coextensive wavy sheets arranged with the ridges of one sheet disposed opposite the grooves of another sheet, and a wavy connecting member disposed between adjacent wavy sheets with the tops of the ridges of the connecting member attached to both ridged and grooved portions of the adjacent surfaces of the wavy sheets.

5. A laminated structure of the character described comprising a plurality of coextensive wavy sheets arranged with the ridges of one sheet disposed opposite the grooves of another sheet, and a connecting member disposed between adjacent wavy sheets, said connecting member being a sheet of wavy contour to substantially follow the contour of said adjacent wavy sheets and said connecting member also being corrugated to provide the same with ridges which are relatively more numerous than the ridges of said wavy sheets and are attached at their tops to the adjacent surfaces of the wavy sheets.

6. A laminated structure of the character described comprising a plurality of coextensive wavy sheets of paper arranged with the ridges of one sheet disposed opposite the grooves of another sheet, and a paper connecting sheet of wavy form disposed between adjacent wavy sheets with its ridges extending substantially parallel with the ridges of the wavy sheets, the ridges of said connecting sheet being more numerous than the ridges of said wavy sheets and being attached at their tops to the adjacent surfaces of the wavy sheets.

7. A laminated structure of the character described comprising a ridged fibrous sheet having a coextensive similarly ridged fibrous sheet disposed in spaced relation to each surface thereof, said coextensive sheets being arranged with the ridges thereof disposed opposite the grooves of the first mentioned sheet, and a ridged fibrous connecting sheet disposed between each of said similarly ridged sheets and the first mentioned sheet with its ridges extending substantially parallel with the ridges of said fibrous sheets, the ridges of the connecting sheets being more numerous than the ridges of said fibrous sheets and connected along their tops to the adjacent surfaces of the fibrous sheets.

HENRY W. LORMOR.